(12) United States Patent
Gummeson

(10) Patent No.: US 8,708,284 B2
(45) Date of Patent: Apr. 29, 2014

(54) ADJUSTABLE PARACHUTE CARGO HARNESS

(76) Inventor: Niklas Henrik Gummeson, Fountain Valley, CA (US)

( * ) Notice: Subject to any disclaimer, the term of this patent is extended or adjusted under 35 U.S.C. 154(b) by 306 days.

(21) Appl. No.: 13/200,213

(22) Filed: Sep. 21, 2011

(65) Prior Publication Data

US 2012/0068017 A1    Mar. 22, 2012

Related U.S. Application Data

(60) Provisional application No. 61/385,417, filed on Sep. 22, 2010.

(51) Int. Cl.
*B64D 17/30*    (2006.01)

(52) U.S. Cl.
USPC ......... 244/151 A; 244/151 R; 182/3; 224/153

(58) Field of Classification Search
USPC ........ 244/151 A, 151 R, 151 B, 138 R; 182/3
See application file for complete search history.

(56) References Cited

U.S. PATENT DOCUMENTS

| | | | | |
|---|---|---|---|---|
| 2,141,041 | A * | 12/1938 | Knight | 244/151 R |
| 2,405,671 | A * | 8/1946 | Quilter et al. | 244/151 R |
| 2,448,066 | A * | 8/1948 | Wilson | 244/151 R |
| 2,725,204 | A * | 11/1955 | Horning | 244/151 R |
| 3,692,262 | A * | 9/1972 | Gaylord | 244/151 A |
| 3,757,744 | A * | 9/1973 | Pravaz | 182/3 |
| 6,179,329 | B1 * | 1/2001 | Bradley | 280/801.1 |
| 8,028,871 | B2 * | 10/2011 | Gray | 224/160 |

* cited by examiner

*Primary Examiner* — Rob Swiatek
*Assistant Examiner* — George Andonyan
(74) *Attorney, Agent, or Firm* — Frank B. Arenas, Esq.

(57) ABSTRACT

An article of manufacture, an optimal adjustable parachute cargo harness device for use with a parachute system is disclosed. A double adjustable upper attachment point used to attach cargo to personal parachute systems is also disclosed.

1 Claim, 6 Drawing Sheets

10 - 10

ADJUSTABLE PARACHUTE CARGO HARNESS

CROSS REFERENCE TO RELATED APPLICATIONS

This Nonprovisional Application for Patent incorporates by reference (to the extent it does not conflict with the disclosure herein) and claims the benefit and priority of pending Provisional Applications having Ser. No. 61/385,417 filed Sep. 22, 2010 entitled "Double adjustable upper attachment point used to attach cargo to personal parachute systems," commonly owned with the instant Application.

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records, but otherwise reserves all copyright rights whatsoever.

BACKGROUND OF THE INVENTION

1. Field of the Invention

Versions and embodiments of the present invention relate generally to parachute equipment and parachute harnesses. Particularly, embodiments of the invention relate to parachute cargo/rucksack harnesses used by human operators carried in fee-fall and optimal adjustment of the harness thereof.

2. Description/Background of the Related Art

The art discussed herein is not to be considered admitted prior art but is presented to more clearly discuss and describe what is still lacking in the earlier art.

Cargo/rucksack harness(es) for personal parachute systems (also used in the industry as tandem systems) are conventionally made using a generic harness with no adjustment capability for the connection between the cargo and the personal parachute harness worn by the parachutist (also known as skydiver in the art). This lack of adjustment between the cargo and the personal parachute harness worn by the parachutist can and has caused safety issues/problems in freefall. An ill-fitting conventional cargo harness shifting due to the air pressure/wind blast impacting on the cargo encased in the cargo harness after exiting an aircraft in flight may cause the cargo and/or cargo harness to cover the operator's (parachutist/skydiver) deployment handles. Worse, this can cause the emergency handles (cut-away and reserve) needed in event of a main parachute malfunction to be inaccessible when needed after deployment. This emergency handle inaccessibility can result in serious injury or death if the reserve (back-up) parachute cannot be deployed at a safe altitude to allow full inflation of the reserve parachute to slow the freefall from approximately 120 MPH (miles per hour) to about 10 MPH for a safe landing.

No device and/or system is known to this inventor that addresses the deficiencies in the earlier art as is used in conventional parachute cargo harness(es). This new, useful and unobvious invention, in various embodiments, accomplishes this much needed advantage of increase in safety and optimal adjustment of conventional parachute cargo harness devices and/or systems.

SUMMARY OF THE INVENTION

Advantages of versions of the present invention include avoidance of most if not all of the above problems by using this optimal adjustable parachute cargo harness.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
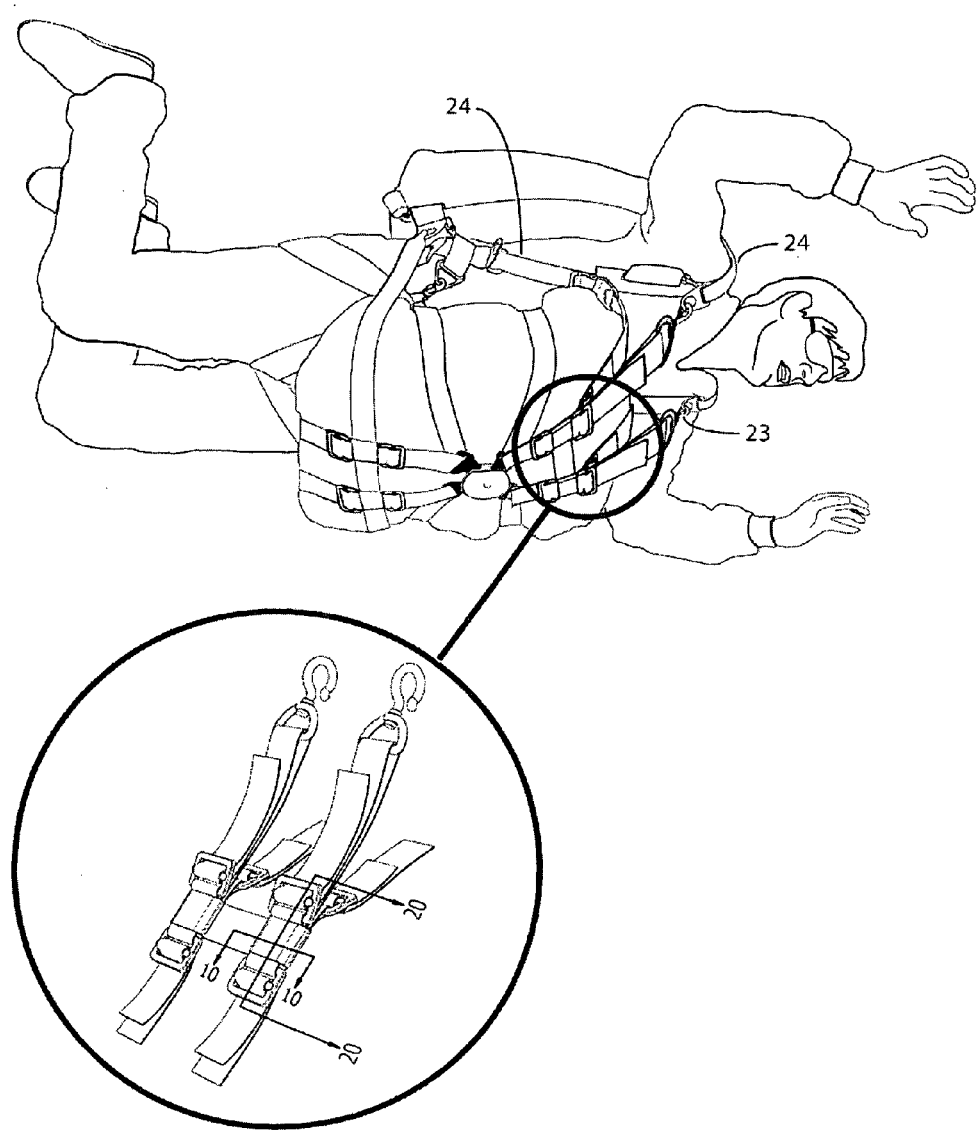
FIG. 1 depicts a version of the invention in context of the operator (parachutist/skydiver) in freefall using a version of the invention.

While the present invention will be described with reference to the details of the embodiments of the invention shown in the drawings (and some embodiments not shown in the drawings), these details are not intended to limit the scope of the invention. As would be known by one of average skill in the art, such as a parachute rigger, parachute equipment designer and/or parachute equipment manufacturer, modifications may be made that are intended to be within the scope of versions of the invention.

DETAILED DESCRIPTION OF THE PREFERRED EMBODIMENT

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "include(s)" and/or "including" means "including but not limited to" any combination or permutation of all, one, some, a plurality or none of each of the item or list mentioned.

Figure 3:
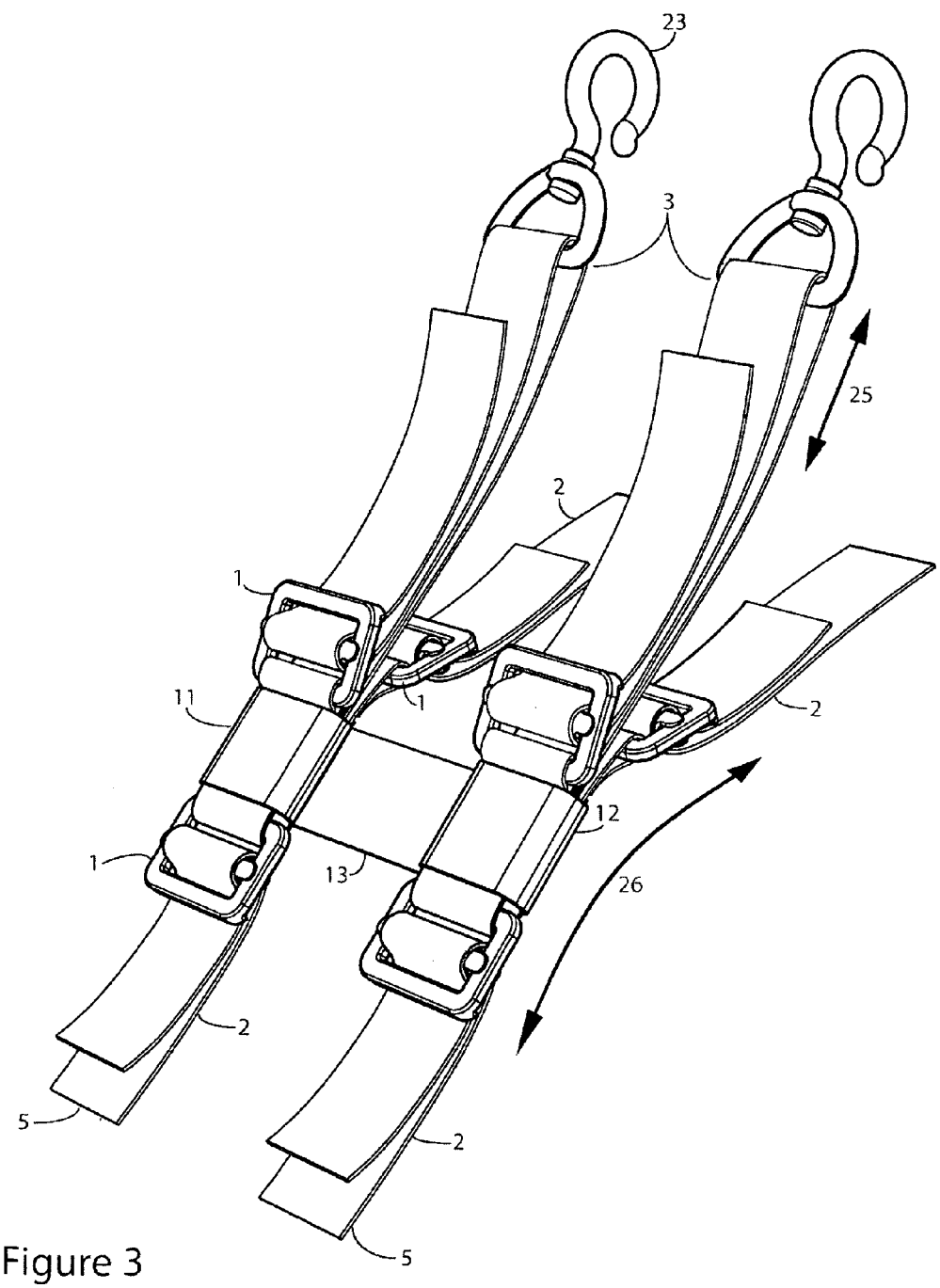
FIG. 3 depicts a version of the invention with the adjustment of cargo to operator's parachute harness and adjustment of hook-up point on cargo.

A version of the basic concept (double adjustable upper attachment point is herein defined as essentially shown in FIG. 3) is shown in detail in the drawings, specifically FIG. 3, depicting in detail the left (looking at a front view) center junction 11 (junction means) and right center junction 12 joined by cross strap 13 (attachment means/means for connecting) and friction adapters 1 (attachment means) connected via straps 2 (means for connecting). The straps are typically nylon webbing of sufficient tensile strength for the intended use but any suitable material may be used. The center junction serves as a load-bearing hook-up point for the cargo and a load-bearing hook-up point to the operator's parachute harness.

As shown in FIG. 1 and FIG. 3, snap shackles 23 are used to attach the cargo harness to the parachute harness 24. The cargo end(s) attach to conventional cargo straps/webbing in a predetermined configuration as desired by the user/operator. 25 depicts the line of tension for the adjustment of hook-up point to cargo, while 26 depicts the line of tension for the adjustment of hook-up point to the operator's parachute harness 24.

The attachment means and/or means for connecting may be of any suitable type—loop, aperture, glue, sewn, webbing, fastener, screw, bolt, weld, friction adapter, snap shackle, connector link (either hard or "soft" as known in the art), grommet, snap, rivet, thread, rope, twine, rod, dowel, hook, plug, connector, and/or any other means, either attached/secured permanently, temporarily and/or releasably attached.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, and/or integrated onto each other as desired by the operator.

At least one of the basic components is necessary but a plurality may be utilized if desired for different versions of the invention. This basic embodiment replaces the conventional parachute cargo harness adjustment mechanism in the conventional art. This great improvement over the prior art expands greatly the operator's control of the cargo prior to use in and during freefall and reduces or eliminates the dangerous shifting of the cargo of the conventional parachute cargo harness(es) when used.

Versions of the invention may be made with any and all suitable materials desired as needed for the appropriate use and is not limited by the type of materials that may be used. Versions are all scalable and may be made any suitable size; large, small and/or any size as desired. Versions of the invention may be retro-fitted to existing (used) conventional parachute cargo harness(es) and/or manufactured as new parachute cargo harness(es).

To make a version of the invention in a preferred embodiment, one skilled in the art would follow these instructions and drawings disclosed herein, as for example and for illustration and not intended to be limiting. All steps for construction are well known in the parachute rigging, designing and manufacturing industry.

Construction of Double Adjustable Upper Attachment point for optimal adjustable parachute cargo harness:

Component List.

Nylon webbing Mil-W-4088 Type VII—12.5 inches length—2 each

Nylon webbing Mil-W-4088 Type VII—24 inches length—2 each

Nylon webbing Mil-W-4088 Type VII—16.25 inches length—1 each

Friction adapters, PS-22040 or equivalent—6 each

Snap shackles Swivel L:4 inch or equivalent—2 each

Preparation:

Using a hot-knife, cut the Nylon webbing material into webbing components as listed in Component list above. Using a fabric marker, mark a fold-line on Nylon webbing Mil-W-4088 Type VIII, 12.5 in, 6.75 inches from one end. Optional: Friction adapters may be fitted with 2.5 inch, Mil-W-4088 type IV, buffer.

Figure 2:
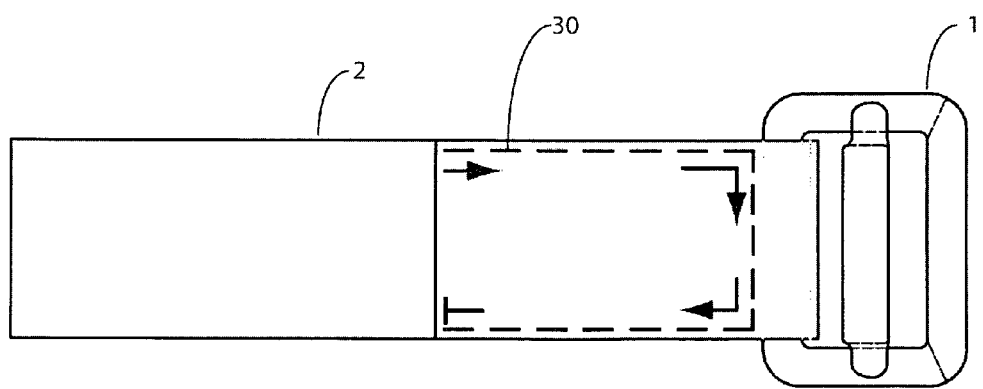
FIG. 2 depicts a version of a typical friction adapter and sewing pattern used in versions of the concept.

Assembly:

As shown in FIG. 3, the Double Adjustable Upper Attachment point consists of two identical side pieces including three friction adapters 1 each, Right and Left, joined by a single cross strap 13. This central junction with two friction adapters 1 is used for cargo attachment (hook-up point) and one friction adapter 1 is used for attachment (hook-up point) to operator's parachute harness To build a side piece wrap, Nylon webbing 2 Mil-W-4088 Type VIII, 12.5 inches long, around a friction adapter 1 (shown in FIG. 1 and FIG. 3). Mark fold-line and glue in place with hot-glue. Using a Class 7 sewing machine and 5-cord (thread size 346) sew hardware in place with a U-shaped stitch pattern 30 (as illustrated in FIG. 2) starting at fold-line down the long side of the folded material towards the friction adapter. At friction adapter turn 90 degrees and come across the webbing just in front of the friction adapter. Turn 90 degrees away from the friction adapter and sew back up the opposite long side, ending at the fold-line.

Add Nylon webbing Mil-W-4088 Type VII, 24 inches long, by stacking it on top of stitched material with edge starting at the fold-line. Glue in place with hot-glue. Using the remaining webbing, Nylon webbing Mil-W-4088 Type VIII, 12.5 inches long, to lace remaining friction adapters as shown in FIG. 1 section view 20-20. The material should stack up in an S-folded manner on top stitched material. Glue in place with hot glue. Repeat this process for opposite side.

The two sides are joined together by wrapping Nylon webbing Mil-W-4088 Type VII, 16.25 inches, 1.5 turns, diagonally across each side piece starting on the back side, in the space between friction adapters as illustrated in FIG. 1 section view 10-10. Glue in place with hot-glue and finish assembly by sewing a 4-point W-stitch pattern, using a Class 7 sewing machine and 5-cord (thread size 346) over the wrapped part, one stitch pattern on each of each side piece.

Figure 4:
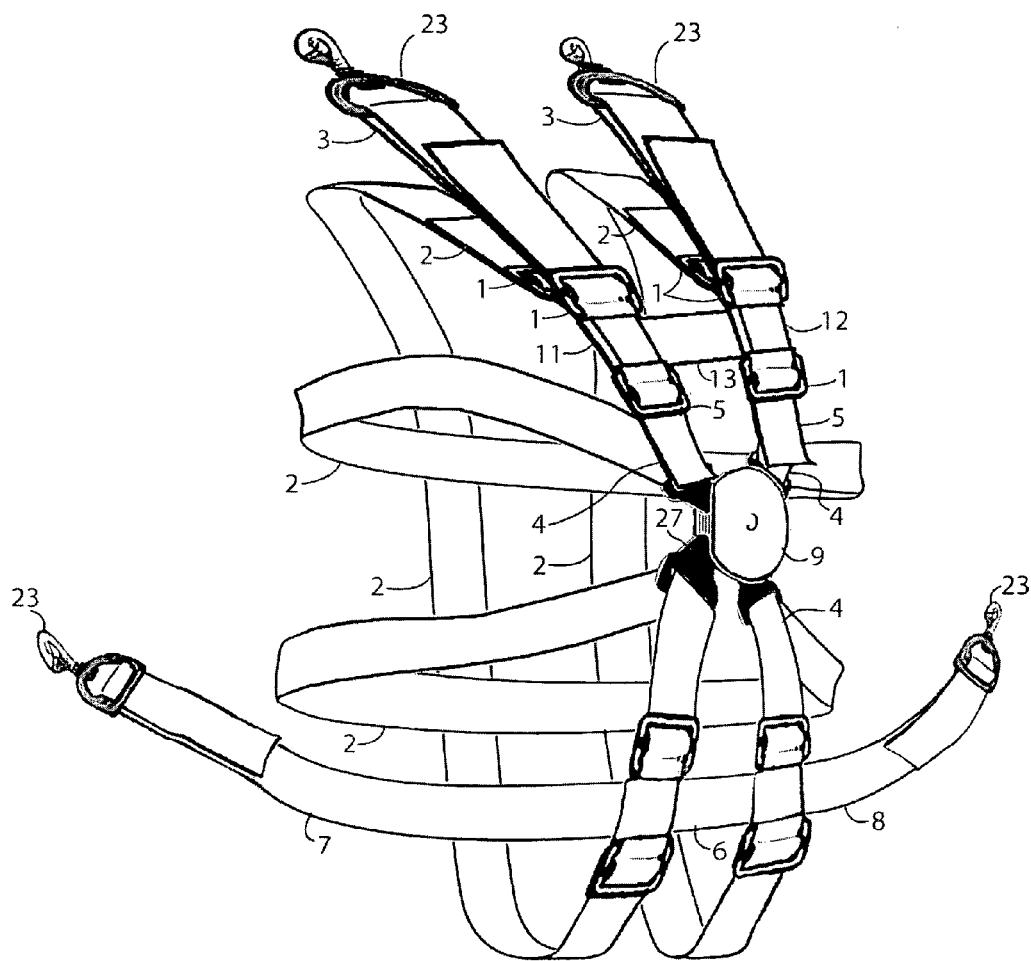
FIG. 4 depicts another version of the invention.
Figure 5:
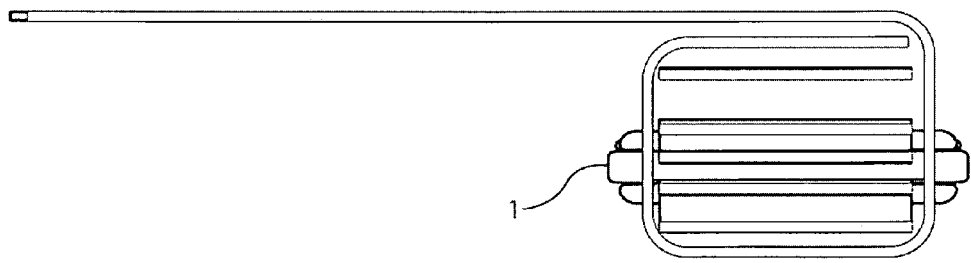
FIG. 5 depicts a detail of a version of the invention.
Figure 6:
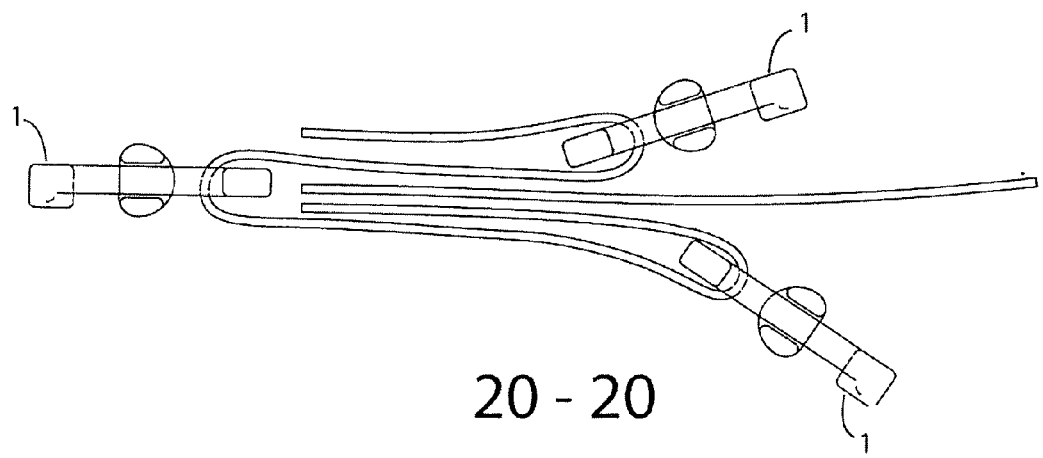
FIG. 6 depicts another detail of a version of the invention.

Lastly, lace Nylon webbing through hook hardware/snap shackle 23 then back through friction adapter once for each side piece. This device/system may be integrated into a conventional cargo parachute harness using eight cargo straps (or any number straps in a predetermined configuration desired) and a typical 4-point quick release as shown in FIG. 4, shown for example and illustration only and not intended to be limiting. As disclosed in FIG. 4, another version of the invention consists of one left center junction 11 attached to one right center junction 12 via one cross strap 13, all of desired length, width and height, and;

two friction adapters 1 attached to the top of the left center junction 11 and two friction adapters 1 attached to the top of the right center junction 12, and;

one friction adapter 1 attached to the bottom of the left center junction 11 and one friction adapter 1 attached to the bottom of the right center junction 12, and;

including of one top harness strap 3 attached to one friction adapter 1 attached to the left center junction 11 and one top harness strap 3 attached to one friction adapter 1 attached to the right center junction 12, each top harness strap 3 having a snap shackle 23 attached to each top harness strap 3 and one top cargo strap 2 attached to one friction adapter 1 attached to each left center junction 11 and right center junction 12, the top cargo strap 2 further having one cargo end 4 and one bottom cargo strap 5 attached to the bottom of each left center junction side friction adapter 1 and right center junction side friction adapter 1, the bottom cargo strap 5 having one cargo end 4, and including a plurality of cargo straps 2 in a pre-determined configuration, said configuration suitable for holding cargo in freefall attached to a personal parachute harness, and including a four-point quick release 9 wherein the plurality of cargo straps terminate at the four-point release 9 via male attachment hardware 27 and including a lower lateral strap 6 with a left side 7 and a right side 8 each having a snap shackle 23 attached to the ends of the lower lateral strap 6.

The primary requirements for successful use of versions of the invention are the design parameters set by the parachute equipment manufacturer of the operator's parachute harness. These requirements may vary from one particular parachute equipment manufacturer to another. Versions of the invention may be used with single and tandem parachute systems to allow operation by a parachutist/skydiver and cargo prior exiting an aircraft in flight and during freefall until landing.

To use the invention in this embodiment, one skilled in the art would prepare the cargo in such way that it has a high density, is symmetrical and have a flat surface (front side) that will be exposed to the relative wind in the free-falling part of the parachute jump.

Then, extend the eight cargo straps fully and open the 4-point quick release to allow cargo to be placed inside the eight cargo straps. Place cargo inside the eight cargo strap, close 4-point quick release and tighten straps. Adjust the double adjustable upper attachment point on the cargo in such way that it is located in the upper half of the front part of the cargo as illustrated in FIG. 1. The lower attachment point should be located on the lower half of the front side of the cargo. All eight cargo straps have to be tightened firmly while symmetry is maintained. After tightening stow all excess webbing.

Next, while the parachutist is wearing his parachute, attach the cargo harness with cargo to the cargo attachment points of the parachute harness. The double adjustable upper cargo attachment point should be attached to the upper cargo attachment points of the parachute harness. The lower adjustable cargo attachment point should be attached to the lower rear cargo attachment points of the parachute harness. Tighten all four straps firmly and stow excess all webbing. The optimal adjustable parachute cargo harness is ready to use in free-fall as desired. As used herein, the cargo harness encloses the cargo and the parachute harness encloses the operator/parachutist/skydiver.

To release the cargo harness from the parachute harness and release the cargo from the cargo harness, reverse the above procedure.

The above-referenced list(s), option(s), function(s), instruction(s), component(s), application(s), interaction(s), item(s), product(s), good(s), group(s) and sub-group(s) are merely intended as illustration and examples, and are not intended by the inventor to in any way limit the addition, deletion or modification of any said list(s), option(s), function (s), instruction(s), component(s), application(s), interaction (s), item(s), product(s), good(s), group(s) and sub-group(s) as might be desirable or useful to someone skilled in the art.

As will be apparent to persons skilled in the art, such as a person in the parachute industry, parachute rigger, parachute designer, parachute manufacturer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

I claim:

1. An article of manufacture, an adjustable parachute cargo harness device for use with a personal parachute system, consisting of:
    one left center junction attached to one right center junction via one cross strap, all of desired length, width and height, and;
    two friction adapters attached to the top of the left center junction and two friction adapters attached to the top of the right center junction, and;
    one friction adapter attached to the bottom of the left center junction and one friction adapter attached to the bottom of the right center junction, and;
    including of one top harness strap attached to one friction adapter attached to the left center junction and one top harness strap attached to one friction adapter attached to the right center junction, each top harness strap having a snap shackle attached to each top harness strap and;
    one top cargo strap attached to one friction adapter attached to each left center junction and right center junction, the top cargo strap further having one cargo end and one bottom cargo strap attached to the bottom of each left center junction side friction adapter and right center junction side friction adapter, the bottom cargo strap having one cargo end, and including a plurality of cargo straps in a pre-determined configuration, said configuration suitable for holding cargo in freefall attached to a personal parachute harness, and including a four-point quick release wherein the plurality of cargo straps terminate at the four-point release via male attachment hardware and including a lower lateral strap with a left side and a right side, each having a snap shackle attached to the ends of the lower lateral strap.

* * * * *